United States Patent [19]

Denebeim

[11] 4,133,297
[45] Jan. 9, 1979

[54] VAGINAL BARRIER FOR ANIMALS

[76] Inventor: Julian B. Denebeim, 220 Shelter Cove Dr., El Granada, Calif. 94019

[21] Appl. No.: 762,496

[22] Filed: Jan. 26, 1977

[51] Int. Cl.$^2$ ............................................ A01K 21/00
[52] U.S. Cl. .................................................. 119/143
[58] Field of Search ................................. 119/143, 95

[56] References Cited

U.S. PATENT DOCUMENTS

| | | | |
|---|---|---|---|
| 3,176,657 | 4/1965 | Callaway | 119/143 |
| 3,786,787 | 1/1974 | Weinberger | 119/95 |

FOREIGN PATENT DOCUMENTS 943116  11/1963  United Kingdom ..................... 119/143

Primary Examiner—Russell R. Kinsey
Assistant Examiner—Daniel J. Leach
Attorney, Agent, or Firm—Julian Caplan

[57] ABSTRACT

To prevent conception of dogs, cats and other quadruped female animals, a barrier is provided consisting of an apron, preferably fabricated of a single piece of material plus straps to secure the apron in position. The device has a first aperture for the tail of the animal and has an enlarged open portion permitting defecation. A second aperture is formed providing two straps which extend through the crotch and between the straps is an apron-like flap, which is preferably weighted to hang down over the vulva to prevent penetration by the male but sufficiently flexible not to interfere with urination. The end of the device near the first aperture extends across the back of the animal in front of the tail and has first snap elements, preferably two female snaps. The opposite end of the device has a hem for an elastic strap and can be folded to shorten the overall length to accommodate smaller animals. The strap preferably has adjustable buckles having second snap elements to be secured to the first snap elements. The second end fits under the belly of the animal and the elastic straps are drawn up around the sides.

1 Claim, 3 Drawing Figures

VAGINAL BARRIER FOR ANIMALS

This invention relates to a new improved barrier to the vaginal canal of small animals, such as dogs, to prevent conception when the animal is in heat.

A principal feature and advantage of the present invention is to provide a barrier which is adjustable to fit various sizes of animals within reasonable limits. It is easily applied and removed and is comfortable when in place.

Another feature of the invention is the provision of a barrier which permits normal defecation and urination and yet continuously provides a barrier to the vulva which prevents penetration by the male.

The device is light in weight and preferably made principally of transparent plastic material so that it is not unsightly in place and the device is washable and non-reactive.

A commonly used device for the same purpose of the present invention employs a holder for a pad which fits over the vulva. The use of such pads is eliminated; and, further, impedance to urination is not present in the present invention.

Another prior device is that shown in U.S. Pat. No. 3,176,657. The present invention differs from this device in that there are no hinges required, the barrier providing its own hinge by reason of the flexibility of the plastic material. The present invention is lighter in weight and more comfortable in use. There is no possibility of the device snagging. In addition, the device of the present invention is much easier to apply and remove, is less expensive and is more sanitary.

Other objects of the present invention will become apparent upon reading the following specification and referring to the accompanying drawings in which similar characters of reference represent corresponding parts in each of the several views.

Figure 1:
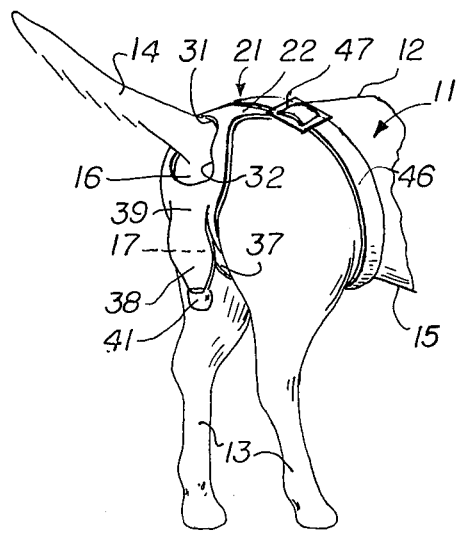
FIG. 1 is a schematic perspective view of the device in use.
Figure 3:
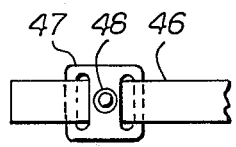
FIG. 3 is an enlarged view of a buckle on the strap used with the invention.

The device of the present invention is used on small female animals such as dogs and cats while in heat to prevent conception. In FIG. 1 of the accompanying drawing the hind quarters of a dog 11 are shown. The device is applied extending from the back 12 down between the legs 13 to the belly 15. Provision is made for protrusion of the tail 14 and for excretion through the anus 16. However, a barrier is provided to the vulva which is indicated generally by reference numeral 17.

Figure 2:
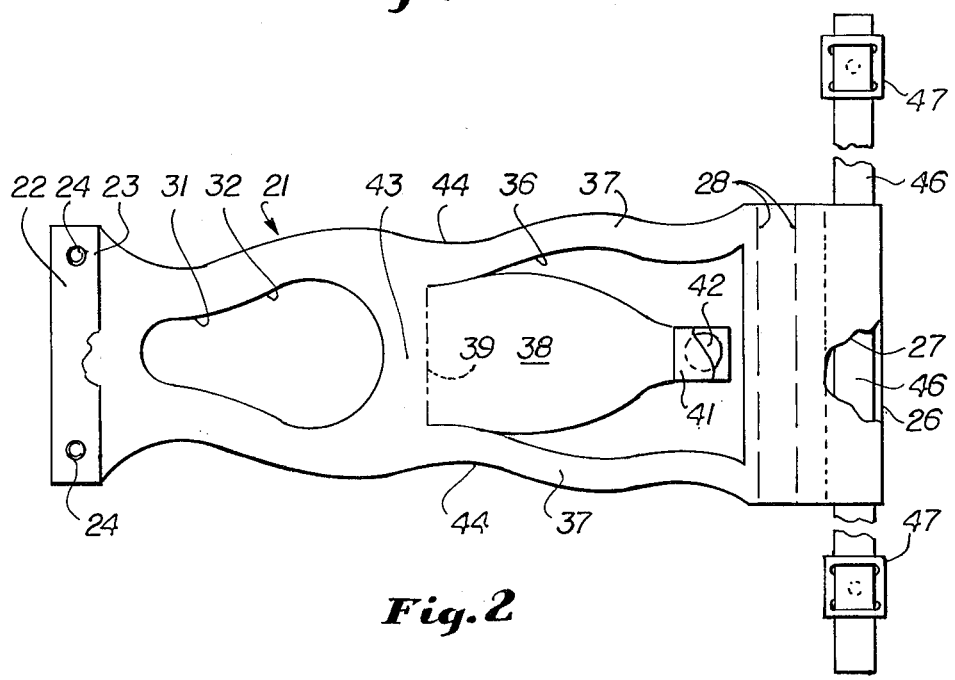
FIG. 2 is a plan view of the device flattened out prior to being placed in position.

Directing attention to FIG. 2, the barrier 21 comprises an elongated piece of material, preferably of clear flexible plastic such as polyethylene. At the top end 22 there is preferably formed a fold 23 for purpose of reinforcement and a pair of female snap elements 24 are applied on opposite sides of the top end 22.

At the opposite or lower end 26 a hem 27 is formed and there are provided a plurality of fold lines 28 so that the hem portion 27 may be folded over one or more times in order to accommodate different size animals.

Adjacent top end 22 there is a generally key-hole shaped first aperture 31 having an enlargement 32 which, in the position of use, fits so that the tail 14 extends through the narrow portion of the first aperture 31 and the enlargement 32 surrounds the anus 16.

Extending from about the middle of the barrier 21 in the direction of the second end 26 is a second aperture 36 which is cut so as to provide two relatively narrow straps 37 on either side. A transversely extending portion 43 is between apertures 32 and 36. Between the straps 36 there is an apron 38 which is generally narrower than the aperture 36. The apron 38 is preferably integral with the material of which the barrier 21 is formed; and its upper edge 39, which functions as a hinge to portion 43, permits the apron 38 to hang vertically downward even though the straps 37 are drawn between the legs 13, all as hereinafter described. In order to hold the apron 38 down in a position blocking entrance to the vulva 17, there is preferably formed a pouch 41 at the lower end of the apron in which a weight 42 may be inserted if required.

Slideable within the hem 26 is an elastic strap 46. Adjustably positioned on each end of the strap 46 are buckles 47 which may be moved toward and away from the barrier 21 in order to accommodate different size animals. Each buckle 47 is formed with a male snap element 48 which cooperates with the snap elements 24 when the device is in place.

Redirecting attention now to FIG. 1, the top end 22 is installed at the rear of the back 12, the tail 14 projecting through the narrow portion of the first aperture 32. The straps 37 are drawn down between the legs 13 until the lower end 26 is under the belly 15. The ends of the straps 46 are drawn up around the sides of the animal and the snaps 48 are snapped into the snaps 24. The buckles 47 are adjusted in position to hold the straps 46 snugly in place. As has heretofore been mentioned, if the animal is small, the hem 27 may be folded over one or more times to reduce the overall length of the barrier 21.

When in place, the apron 38 hangs vertically downward, the weight 42 assisting in holding the apron in place. When in place, the apron 38 prevents penetration of the animal.

What is claimed is:

1. A device for the purpose described comprising an elongated member comprising a unitary piece of flexible washable plastic formed near a first end with a first aperture for protrusion of the tail and expose of the anus of the animal to which the device is applied, said first aperture being totally unobstructed, a second aperture separate from said first aperture and formed near a second end opposite said first end defining two straps on either side of said second aperture, a transversely extending portion between said apertures, an apron within said second aperture integral with and flexibly joined to said transversely extending portion, a weight in a pouch on the end of said apron which is downmost in position of use, said apron being unconnected to said member at its lower end, to cause said apron to hang downward over the vulva, said second aperture being unobstructed except by said flexible apron, means comprising a third strap extending from one of said ends adapted to fit around the sides of the animal and cooperating attachment means on the other of said ends and said third strap to hold said member in position.

* * * * *